United States Patent [19]

Ive

[11] Patent Number: 4,486,780
[45] Date of Patent: Dec. 4, 1984

[54] SEQUENTIAL DATA BLOCK ADDRESS PROCESSING CIRCUITS

[75] Inventor: John G. S. Ive, London, England

[73] Assignee: Sony Corporation, Tokyo, Japan

[21] Appl. No.: 226,861

[22] Filed: Jan. 21, 1981

[30] Foreign Application Priority Data

Jan. 30, 1980 [GB] United Kingdom ............... 8003085

[51] Int. Cl.³ ............................................. H04N 5/93
[52] U.S. Cl. .................................. 358/160; 358/339; 360/36.2; 371/37
[58] Field of Search ................. 358/160, 339; 371/37, 371/38, 41; 340/825.53; 370/92; 360/49, 36.1, 36.2; 364/514, 518, 709, 710

[56] References Cited

U.S. PATENT DOCUMENTS

| 4,180,070 | 4/1979  | Taylor   | 358/160 |
| 4,215,368 | 7/1980  | Flory    | 358/160 |
| 4,282,550 | 8/1981  | Coviello | 358/160 |
| 4,302,776 | 11/1981 | Taylor   | 358/160 |

Primary Examiner—Tommy P. Chin

Attorney, Agent, or Firm—Lewis H. Eslinger; Alvin Sinderbrand

[57] ABSTRACT

A sequential data block address processing circuit for deriving address signals in dependence on incoming data which comprises sequential blocks of data each including an address signal representing a number, the numbers changing cyclically from block to block, for example where the incoming data is derived from a video tape recorder and represents video information comprising sequential blocks of data each representing a horizontal line scan of video information and each including a line address signal, the circuit comprising an address counter to generate output address signals corresponding to the incoming address signals and likewise changing cyclically from block to block under control of a signal derived from an oscillator and supplied by way of a counter operating as a frequency divider, and an arrangement formed by three latch circuits, an add and delay device, a line address comparator, and a counter for synchronizing the output address signals relative to the incoming address signals only when a predetermined plurality of the incoming address signals have been correctly received.

16 Claims, 2 Drawing Figures

SEQUENTIAL DATA BLOCK ADDRESS PROCESSING CIRCUITS

BACKGROUND OF THE INVENTION

1. Field of the Invention

This invention relates to sequential data block address processing circuits.

2. Description of the Prior Art

It is known to derive address signals in dependence on incoming data which comprise sequential blocks of data each including an address signal representing a number, the numbers changing cyclically from block to block. The invention is particularly, but not exclusively, for deriving address signals in dependence on incoming data derived from a digital video tape recorder (VTR) and which comprise sequential blocks of data each formed by a plurality of pulse coded samples together representing a block of video information.

SUMMARY OF THE INVENTION

One object of the present invention is to provide an improved data block address processing circuit.

Another object of the present invention is to provide an improved data block address processing circuit which operates by predicting incoming address signals.

Another object of the present invention is to provide an improved data block address processing circuit which operates by matching incoming address signals with locally generated address signals and which only effects synchronization on the basis of the incoming address signals when a plurality of successive successful matches have occurred.

According to the present invention there is provided a sequential data block address processing circuit for deriving address signals in dependence on incoming data which comprise sequential blocks of data each including an address signal representing a number, the numbers changing cyclically from block to block, the circuit comprising:

first means to generate output address signals corresponding to the incoming address signals and likewise changing cyclically from block to block; and second means to synchronize said output address signals relative to said incoming address signals only when a predetermined plurality of said incoming address signals have been correctly received in sequence.

The above, and other objects, features and advantages of this invention will be apparent from the following detailed description of illustrative embodiments which is to be read in connection with the accompanying drawings.

DESCRIPTION OF THE PREFERRED EMBODIMENTS

The sequential data block address processing circuit to be described is for use with a digital VTR wherein the actual video information of a PAL television signal, that is to say the television signal less the vertical and horizontal synchronizing signals and the burst signals, is recorded in digital form by sampling the video information and coding the sample values so obtained into 10-bit words for recording. On recording the digital information, addresses are included so that the information can be identified on reproduction. For the purposes of the present description it is sufficient to say that the addresses which are recorded comprise line addresses which cycle repeatedly through the numbers zero to seven, and that there are also recorded line start pulses to indicate the start of each line, that is to say the start of each sequential block of data corresponding to one horizontal line scan of a television picture.

The information is recorded in serial form at a bit rate of 40 Megabits per second and on reproduction is converted from serial to parallel form, so that the 10-bit words corresponding to respective video information samples are produced at 4 MHz, that is four million words per second. The words so produced are fed to a group of eight line stores for temporary storage to eliminate the time base error which the reproduced data includes. The output of the line stores are then error-corrected and error-concealed, and finally the vertical and horizontal synchronizing signals and the burst signals are added thereto to form the final reproduced television signal.

Figure 1:
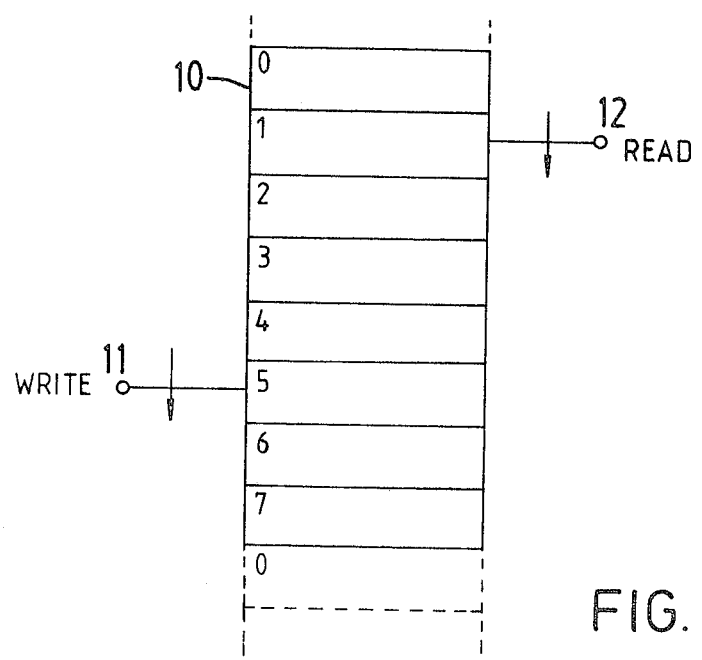
FIG. 1 shows in block form a line store arrangement.

Referring to FIG. 1, the eight line stores together form a line store arrangement 10, each of the individual line stores of which is capable of storing a block of data corresponding to one line. The blocks of data are written in via a write data input terminal 11 which is shown as connected to the fifth line store, although in fact the line store into which the successively blocks of data are written cycles through the line store arrangement 10 under the control of a line store address signal, the derivation of which will be described below. The blocks of data are read out via a read data output terminal 12 which is shown as connected to the first line store although in fact, like the write data input terminal 11, the read data output terminal 12 cycles through the line store arrangement 10. The direction in which the write data input terminal 11 and the read data output terminal 12 cycle is the same in each case and is indicated by the downwardly directed arrows. In normal operation the spacing between the lines store being written in and the line store being read from is four line stores. In both writing and reading the zero line store follows in sequence after the seventh line store.

To control the writing of the blocks of data the individual line stores of the line store arrangement 10 are addressed making use of line address signals derived from the reproduced signal, and the embodiment to be described is particularly concerned with maintaining the correct sequence of line address signals despite some incidence of drop-out resulting in total loss of one or more line addresses from the reproduced signal and individual bit error where some effect, such as transient noise, results in the loss or change of one, or possibly more than one individual bit in a line address. In the absence of corrective action either of these two errors may have a serious detrimental effect on a reproduced television picture, not only due to the primary error; for example, the corruption of a bit from a line address resulting in wrong addressing of the line store arrangement 10, but also due to consequent induced secondary error; which in the example just given might well be corruption of a block of data previously and correctly stored in the line store then wrongly addressed due to the primary error.

Figure 2:
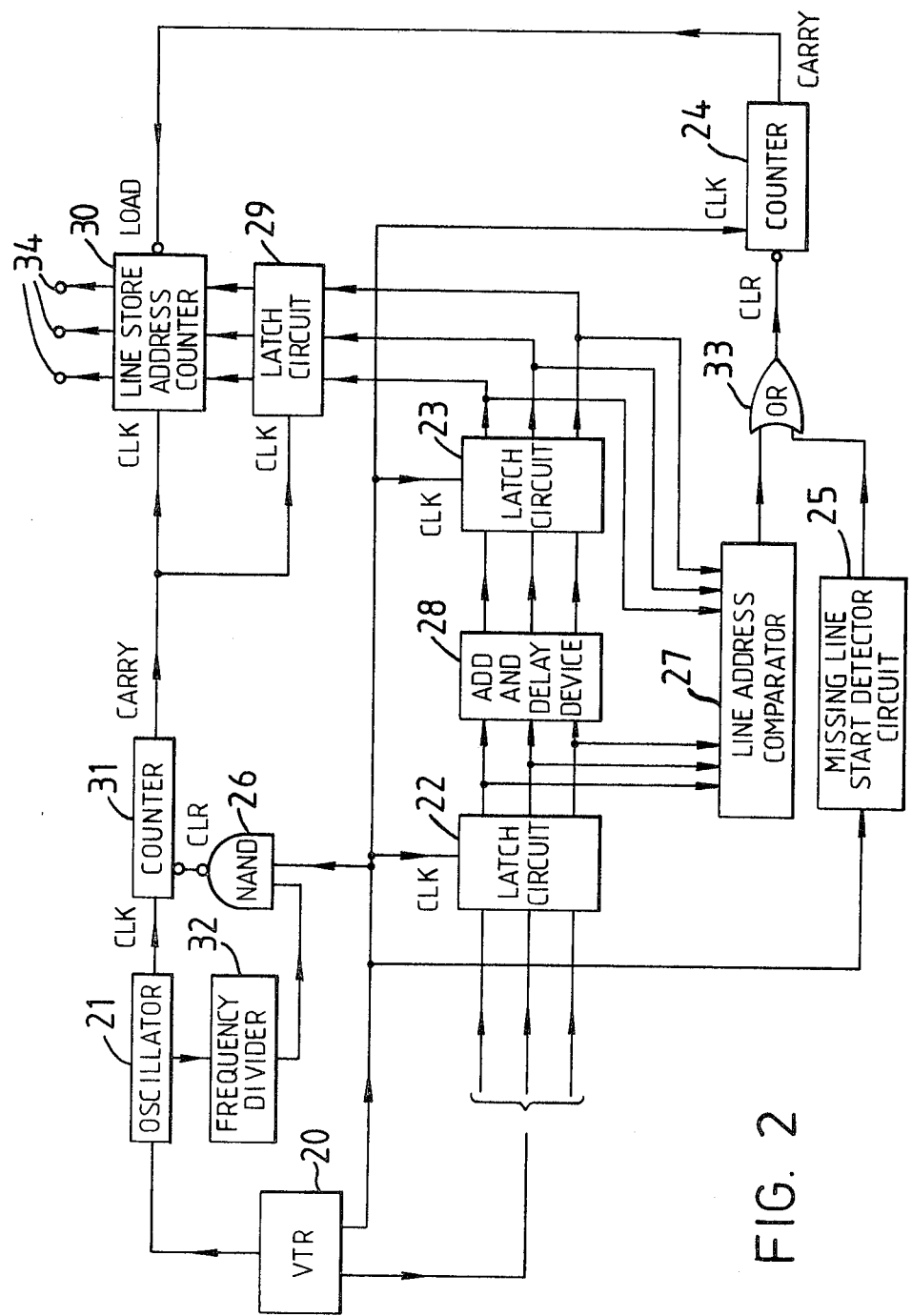
FIG. 2 shows in block form an embodiment of a sequential data block address processing circuit according to the invention.

The embodiment will now be described with reference to FIG. 2, and is associated with a digital VTR 20 in which video information has been recorded in digital form as above described. The VTR 20 supplies three inputs to the embodiment. Firstly, there is supplied a signal at the rate of the reproduced words, which signal maintains the synchronization of an oscillator 21 the normal frequency of which is 40 MHz, that is the bit rate, and which is internally divided down to 4 MHz, that is to say to the intended rate of reproduction of the words. Secondly, there are supplied reproduced line start pulses at a frequency of 15.625 KHz, that is to say the PAL television line frequency, and derived from the reproduced video information, to the clock terminals of latch circuits 22 and 23, to the clock terminal of a 16-count counter 24, to the input of a missing line start detector circuit 25, and to one input of a NAND-circuit 26. Thirdly, the reproduced data, or at least the three bits of each word corresponding in position to a line address, are supplied in parallel form to respective inputs of the latch circuit 22 which gates out the line address as described below.

The outputs of the latch circuit 22 are connected to respective inputs of a line address comparator 27 and also to respective inputs of an add and delay device 28, respective outputs of which are connected to respective inputs of the latch circuit 23. Respective outputs of the latch circuit 23 are connected to respective inputs of a latch circuit 29, respective outputs of which are connected to respective inputs of an 8-count line store address counter 30. The 4 MHz output of the oscillator 21 is supplied to the clock terminal of a 256-count counter 31 which forms a frequency divider supplying an output of frequency 15.625 KHz, that is the line frequency, to the clock terminal of the line store address counter 30. The oscillator 21 also supplies an output by way of a 1/256 frequency divider 32 to the other input of the NAND-circuit 26. The signal supplied by the frequency divider 32 has a frequency of 15.625 KHz and forms a line start prediction signal. The output of the NAND-circuit 26 is supplied to the clear terminal of the counter 31.

The outputs of the latch circuit 23 are also connected to respective further inputs of the line address comparator 27, the output of which is connected to one input of an OR-circuit 33. The output of the missing line start detector circuit 25 is connected to the other input of the OR-circuit 33, the output of which is connected to the clear terminal of the counter 24 which has a carry output terminal connected to a load terminal of the line store address counter 30.

At output terminals 34 of the line store address counter 30 output line address signals are developed for controlling the writing of the data into the line store arrangement 10 (FIG. 1).

The operation will now be described and firstly it will be assumed that all is operating normally, in particular that reproduced address signals are being correctly supplied to the input terminals of the latch circuit 22 in the proper sequence, and that reproduced line start pulses are being correctly supplied to the latch circuits 22 and 23, to the counter 24, to the missing line start detector circuit 25 and to the NAND-circuit 26.

Since the reproduced data is being supplied to the inputs of the latch circuit 22, then on occurrence of a line start pulse supplied to the clock terminal thereof, a line address signal will be gated out of the reproduced signal and stored in the latch circuit 22. This stored line address signal will also be supplied to the add and delay device 28 and to the line address comparator 27. The add and delay device 28 adds one to the 3-bit binary number representing the line address, which has the effect of increasing the number by one, except where the original number is seven, in which case the addition of one changes the number to zero. In any case, therefore, the received line address is changed to the next subsequent line address and the signal corresponding to the subsequent address is stored until the occurrence of the next line start pulse whereupon it is transferred into and held in the latch circuit 23. On the occurrence of this next line start pulse the next subsequent reproduced address signal will be gated into and held in the latch circuit 22. At this time, therefore, the latch circuits 22 and 23 will both be supplying the same address signal to the line address comparator 27 which when it receives identical input signals supplies no output to the OR-circuit 33. Likewise, the missing line start detector circuit 25 supplies no input to the OR-circuit 33, so no signal is supplied to the clear terminal of the counter 24. When, therefore sixteen line start pulses have been supplied to the clock terminal of the counter 24, the counter 24 will supply a signal by way of the carry terminal to the load terminal of the line store address counter 30.

In the meantime, the oscillator 21 is supplying the signal at a frequency of 4 MHz to the counter 31 which divides this frequency by 256 to supply a signal at the line frequency, that is 15.625 KHz, to the clock terminal of the line store address counter 30 which divides this frequency by eight and so develops at the output terminals 34 line address signals which are in the correct sequence but are not necessarily synchronized with the reproduced address signals. However, the output of the counter 31 is also supplied to the clock terminal of the latch circuit 29, so once per line the line address signal currently stored in the latch circuit 23 is transferred to the latch circuit 29 and stored therein. Then, when the counter 24 supplies a signal to the load terminal of the line store address counter 30, which signal will only be supplied when sixteen successive correct address signals have been supplied to the latch circuit 22, the address signal currently stored in the latch circuit 29 will be loaded into the line store address counter 30 which will then continue supplying address signals to the output terminals 34 in sequence but now synchronized with the reproduced address signals.

Secondly, it will be assumed that a reproduced address signal supplied to the latch circuit 22 is not in the correct sequence. This may occur, for example, because transient noise has resulted in one or more bits of the reproduced address signal being lost or changed to the other binary value. When this occurs the line address comparator 27 will not be supplied with identical signals for comparison and will in consequence supply an output signal by way of the OR-circuit to the clear terminal of the counter 24. This will cause the counter 24 to revert to zero and will delay supply of a signal by way of the carry terminal to the load terminal of the line store address counter 30 until such time as sixteen successive correct address signals have been supplied to the latch circuit 22.

Thirdly, it will be assumed that one or more reproduced address signals are lost entirely due to drop-out and are not therefore supplied to the latch circuit 22. If only one reproduced address signal is lost, then unless it happens to be the zero address, in which case it does not matter, the line address comparator 27 will supply a signal by way of the OR-circuit 33 to the clear terminal of the counter 24 to reset it on the occurrence of the next reproduced address signal. If more than one reproduced address signal is lost, then on the occurrence of the line start pulse at the time corresponding to the second lost reproduced address signal, the line address comparator 27 will supply a signal as before. In either case, the counter 24 will not reach the count of sixteen and supply a signal to the load terminal of the line store address counter 30 until a sequence of sixteen correct reproduced address signals have appeared.

Fourthly, it will be assumed that one or more line start pulses are missing from the reproduced signal, in which case no signals are supplied to the clock terminals of the latch circuits 22 and 23 or to the clock terminal of the counter 24. However, the line address comparator 27 will not supply an output then or indeed when the line start pulses are restored, assuming that the reproduced address signals have maintained the correct sequence during the break. In such an eventuality, however, the count in the counter 24 will not be correct after the break, and to guard against any error arising for this reason the missing line start detector circuit 25 supplies a signal by way of the OR-circuit to the clear terminal of the counter 24 if a line start pulse is missed. Again, therefore, this means that there is not output signal from the counter 24 to the load terminal of the line store address counter 30 until there has again been a sequence of sixteen correct address signals and of course the associated line start pulses.

So long as the line start pulses are correctly reproduced they will coincide with the pulses of the line start prediction signal supplied to the NAND-circuit 26, so once per line the NAND-circuit 26 will supply a signal to the clear terminal of the counter 31 resetting the counter 31 to zero. If line start pulses are lost then no signals will be supplied by the NAND-circuit 26 to the counter 31 and during such intervals the counter 31 will cycle through the complete count of 256 and return to zero in the normal way. The stability of the oscillator 21, which is typically 0.25%, is sufficient to bridge any likely loss of line start pulses, any likely loss of signals supplied from the carry terminal of the counter 24 to the load terminal of the line store address counter 30, and of course to bridge over vertical blanking intervals. To assist in regaining synchronization it is the carry signal following the count of 127 in the counter 31 which is supplied to the clock terminal of the line store address counter 30, rather than the carry signal following the count of 255. In particular this is to guard against the situation in which the frequency of the oscillator 21 drifts lower during an interval when synchronization is lost. In such a case, if the 255 carry was used the signal from the AND-circuit 26 might clear the counter 31 just before the count of 255 is reached and the signal which should have been supplied to the clock terminal of the line store address counter 30 would not then be supplied. By using the 127 carry, the cumulative error has to rise to 32 microseconds before a count is lost in this way.

It will be appreciated that many modifications can be made. In particular, it should be emphasized that the particular numbers and frequencies which have been quoted are by way of example only. Obviously, the invention can be applied to cases in which the line store arrangement 10 of FIG. 1 has some number of line stores other than eight. In fact, as 625, that is to say the number of lines in a frame of a PAL television signal, is not divisible by eight, and as this results in some complication in the subsequent processing of the reproduced signal, some other number of line stores may be used. For example, twenty-five line stores may be provided in the line store arrangement 10. A reasonably large number of line stores, such as twenty-five, is also required when a VTR with dynamic head tracking is used, as such a system requires an operating window of some twenty lines.

Less obvious perhaps is the fact that the addresses need not follow the natural sequence of numbers. Thus in the embodiment described the addresses cycle through the natural sequence 0, 1, 2, 3, 4, 5, 6, 7, 0, 1, . . . , but the sequence could, for example, be an unnatural sequence such as 0, 6, 1, 2, 4, 7, 5, 3, 0, 6, . . . , the essential feature being that the sequence repeats cyclically. Where the natural sequence of numbers is not used, the add and delay device 28 can be replaced for example by a programmable read-only memory which stores the sequence used and hence can operate to give the same effect as the add and delay device 28.

Moreover, the invention can readily be modified so as to be applicable to the handling of an NTSC television signal.

Also, although the invention has been described as applied to a embodiment in which each block of data is formed by one horizontal line, this is not an essential feature. For example, each horizontal line may be subdivided into two, four or some other number of blocks of data, each of which has an address signal. It will be apparent that an advantage of this is that any error is likely to be more quickly identified as such, and also correction will follow more quickly. Finally, although the invention has been described as applied to the processing of a television signal, it will be appreciated that it is readily applicable to any signal processing arrangement handling sequential blocks of data each including an address.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim

1. A sequential data block address processing circuit for deriving address signals in dependence on incoming data which comprise sequential blocks of data, each block including an incoming address signal represented by a number, the numbers of said sequential blocks of data changing cyclically from block to block, the circuit comprising: first means for generating output address signals corresponding to the incoming address signals such that said output address signals are represented by numbers which change cyclically from block to block; second means connected to said first means and receiving a data signal including said incoming address signals, said second means including comparator means for comparing incoming address signals with respective reference signals to provide an output signal; and control means in response to said output signal to provide a control signal to said first means when a predetermined plurality of said incoming address signals have been correctly received in sequence within said data signals for causing said first means to generate said output address signals in synchronism with said incoming address signals only when said predetermined plurality of said incoming address signals have been correctly received in sequence within said data signal.

2. A circuit according to claim 1 wherein said predetermined plurality is at least equal to one complete cycle of said numbers which represent said address signals of said sequential blocks of data.

3. A circuit according to claim 1 wherein said second means comprises third means to gate out and temporarily store each of said incoming address signals, fourth means to advance each said stored address signal to correspond to the next cyclically changed number which respresents an address signal of a block of said sequential blocks of data, fifth means temporarily to store said advanced address signal as said reference signals until said third means has gated out and temporarily stored the next incoming address signal as said incoming address signals, said comparator means comparing said next incoming address signal with said advanced address signal, and said control means including sixth means to supply said control signal to said first means in response to said comparison by said comparator means to synchronize said output address signals relative to said incoming address signals only when said address comparator has found identity over a predetermined plurality of said comparisons in succession.

4. A circuit according to claim 3 wherein said first means comprises seventh means supplied with said incoming data to generate a pulse signal at the frequency of said incoming blocks of data and first counter means forming an address counter for deriving said output address signals by frequency dividing said pulse signal.

5. A circuit according to claim 4 wherein said seventh means comprises oscillator means and second counter means which operates as a frequency divider.

6. A circuit according to claim 5 wherein said oscillator means operates at a frequency equal to the word rate of the words in said incoming data.

7. A circuit according to claim 4 wherein said first counter means is loaded under control of said control signal with an address signal derived from said advanced address signal.

8. A circuit according to claim 3 wherein said sixth means comprises third counter means the maximum count of which is equal to the number in said cycle and which on reaching said maximum count supplies a carry signal forming said control signal.

9. A circuit according to claim 8 wherein said comparator means supplies a clear signal to said third counter means whenever said comparison shows a lack of identity between said next incoming address signal and said advanced address signal.

10. A circuit according to claim 3 wherein said incoming data further comprise a respective start signal associated with each said address signal, said start signals being used as gate signals for said third and fifth means and as clock signals for said sixth means.

11. A circuit according to claim 10 wherein said second means further comprises means coupled to said sixth means to inhibit supply of said control signal to said first means in the absence of said incoming start signal.

12. A circuit according to claim 5 wherein said incoming data further include a respective start signal associated with each said address signal, said start signals being used as gating signal for said third and fifth means and as clock signals for said sixth means, and wherein said first means further comprises eighth means to generate start prediction signals corresponding respectively to the predicted arrivals of said incoming start signals in response to said incoming data, and a NAND-circuit to which said start prediction signals and said start signals are supplied and on coincidence thereof supplies a clear signal to reset said second counter means.

13. A circuit according to claim 12 wherein said second counter means supplies a carry signal generated half-way through the maximum count of said second counter means to said first counter means as said pulse signal.

14. A circuit according to claim 1 wherein said incoming data represent video information of a television signal and each said block of data represents a plurality of pulse coded samples of said video information.

15. A circuit according to claim 14 wherein each of said block of data represents a plurality of pulse coded samples together representing a horizontal line scan of video information.

16. A circuit according to claim 15 wherein said numbers which represent said address signals of said sequential blocks of data cycle through a sequence zero to seven from line to line.

* * * * *